United States Patent [19]

Haraguchi et al.

[11] Patent Number: 5,425,023
[45] Date of Patent: Jun. 13, 1995

[54] NETWORK SYSTEM AND METHOD OF MANAGING A MAXIMUM TRANSFER UNIT IN THE NETWORK SYSTEM

[75] Inventors: Masahiko Haraguchi; Atsushi Kobayashi, both of Hadano; Toru Horimoto, Atsugi; Itaru Isobe, Hadano, all of Japan

[73] Assignee: Hitachi, Ltd., Tokyo, Japan

[21] Appl. No.: 912,706

[22] Filed: Jul. 13, 1992

[30] Foreign Application Priority Data

Jul. 12, 1991 [JP] Japan .................................. 3-197334

[51] Int. Cl.⁶ .......................... H04J 3/24; H04L 12/56
[52] U.S. Cl. ...................................... 370/60; 370/94.1
[58] Field of Search .................. 370/94.1, 85.13, 85.14, 370/60, 60.1, 94.2, 82, 79, 83, 84, 95.1, 95.3; 375/7, 8, 38

[56] References Cited

U.S. PATENT DOCUMENTS

| | | | |
|---|---|---|---|
| 4,703,475 | 10/1987 | Dretzku et al. | 370/60 |
| 4,771,391 | 9/1988 | Blasbaig | 370/94.1 |
| 4,922,487 | 5/1990 | Eilenberger et al. | 370/60 |
| 4,947,390 | 8/1990 | Sheehy | 370/85.13 |
| 5,051,983 | 9/1991 | Kammerl | 370/60 |
| 5,103,447 | 4/1992 | Takiyasu et al. | 370/94.1 |
| 5,113,392 | 5/1992 | Takiyasu et al. | 370/94.1 |

Primary Examiner—Douglas W. Olms
Assistant Examiner—Ajit Patel
Attorney, Agent, or Firm—Antonelli, Terry, Stout & Kraus

[57] ABSTRACT

A method of managing, in a network system having at least two end systems, at least two networks respectively connected to the at least two end systems and at least one transfer device for connecting the networks and transferring data between the networks, a maximum transfer unit of one unit of data transferred at time on a transfer route connected between the two end systems and including the networks and the transfer device. A table is provided having information about the transfer route in each of the end systems and the transfer device, and an optimum value of maximum data lengths of the one unit of data which are transferable on the transfer route is registered, as the maximum transfer unit for the transfer device, in each of the tables. In particular, the optimum value is a minimum value of maximum data lengths of the one unit of data which are transferable through each of the networks on the transfer route.

33 Claims, 5 Drawing Sheets

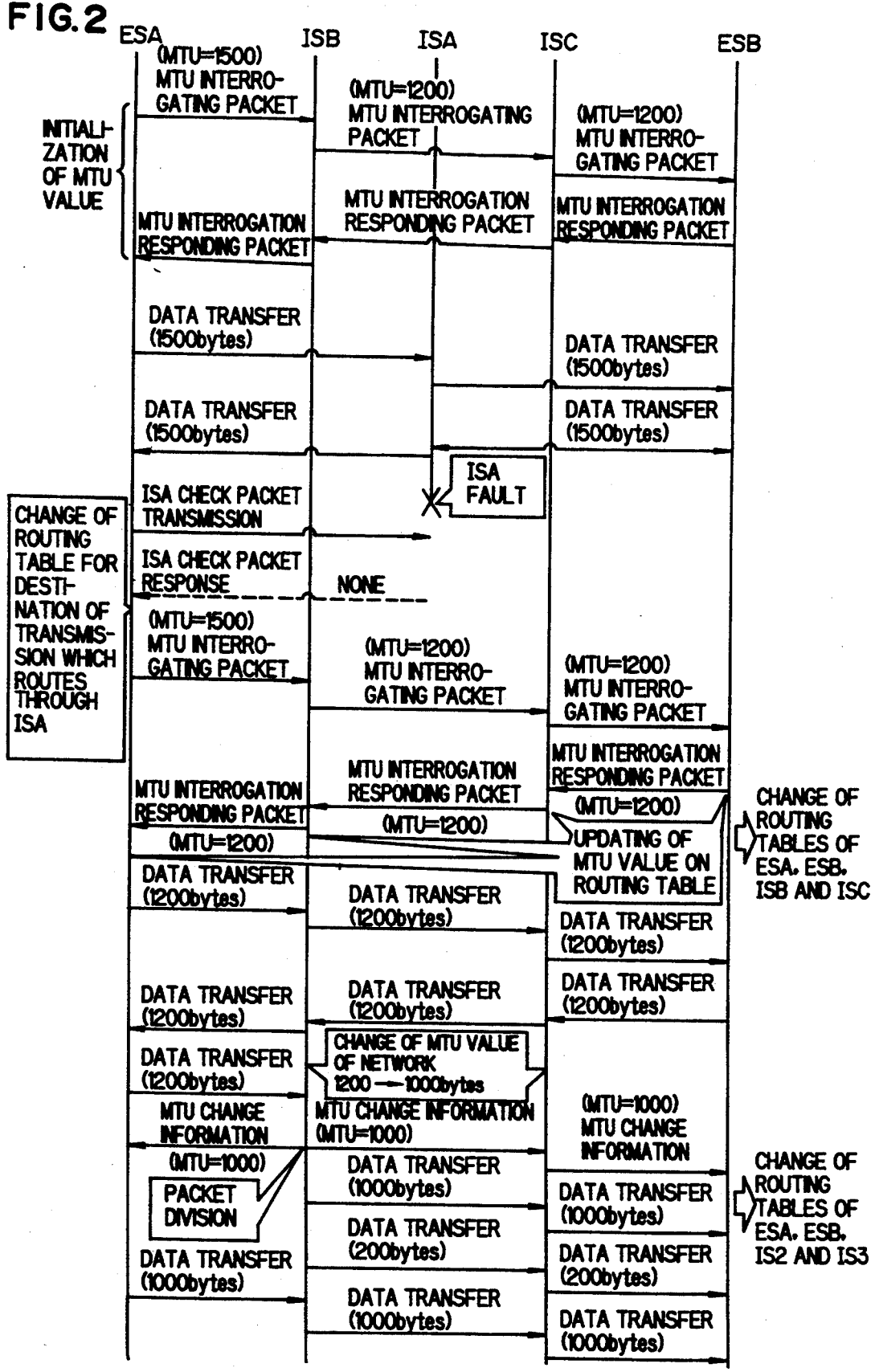

FIG. 3A

ROUTING TABLE OF ESA — 201

| DESTI-NATION | TRANS-FER | MTU |
|---|---|---|
| ESB | ISA | 1500 |

ROUTING TABLE OF ISA — 202

| DESTI-NATION | TRANS-FER | MTU |
|---|---|---|
| ESA | ESA | 1500 |
| ESB | ESB | 1500 |

ROUTING TABLE OF ISB — 203

| DESTI-NATION | TRANS-FER | MTU |
|---|---|---|
| ESA | ESA | 1500→1200 |
| ESB | ISC | 1200 |

ROUTING TABLE OF ISC — 204

| DESTI-NATION | TRANS-FER | MTU |
|---|---|---|
| ESA | ISB | 1200 |
| ESB | ESB | 1500→1200 |

ROUTING TABLE OF ESB — 205

| DESTI-NATION | TRANS-FER | MTU |
|---|---|---|
| ESA | ISA | 1500 |

| DESTI-NATION | TRANS-FER | MTU |
|---|---|---|
| ESB | ISB | 1200 |

203

| DESTI-NATION | TRANS-FER | MTU |
|---|---|---|
| ESA | ESA | 1200 |
| ESB | ISC | 1200 |

204

| DESTI-NATION | TRANS-FER | MTU |
|---|---|---|
| ESA | ISB | 1200 |
| ESB | ESB | 1200 |

205

| DESTI-NATION | TRANS-FER | MTU |
|---|---|---|
| ESA | ISC | 1200 |

| DESTI-NATION | TRANS-FER | MTU |
|---|---|---|
| ESB | ISB | 1000 |

203

| DESTI-NATION | TRANS-FER | MTU |
|---|---|---|
| ESA | ESA | 1000 |
| ESB | ISC | 1000 |

204

| DESTI-NATION | TRANS-FER | MTU |
|---|---|---|
| ESA | ISB | 1000 |
| ESB | ESB | 1000 |

205

| DESTI-NATION | TRANS-FER | MTU |
|---|---|---|
| ESA | ISC | 1000 |

FIG. 3D
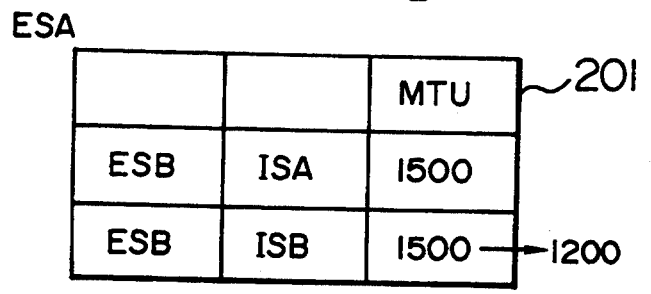
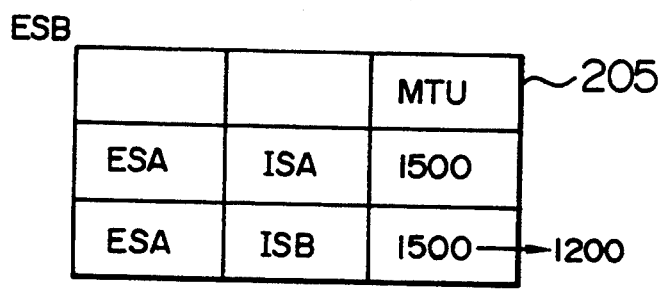
FIG. 4
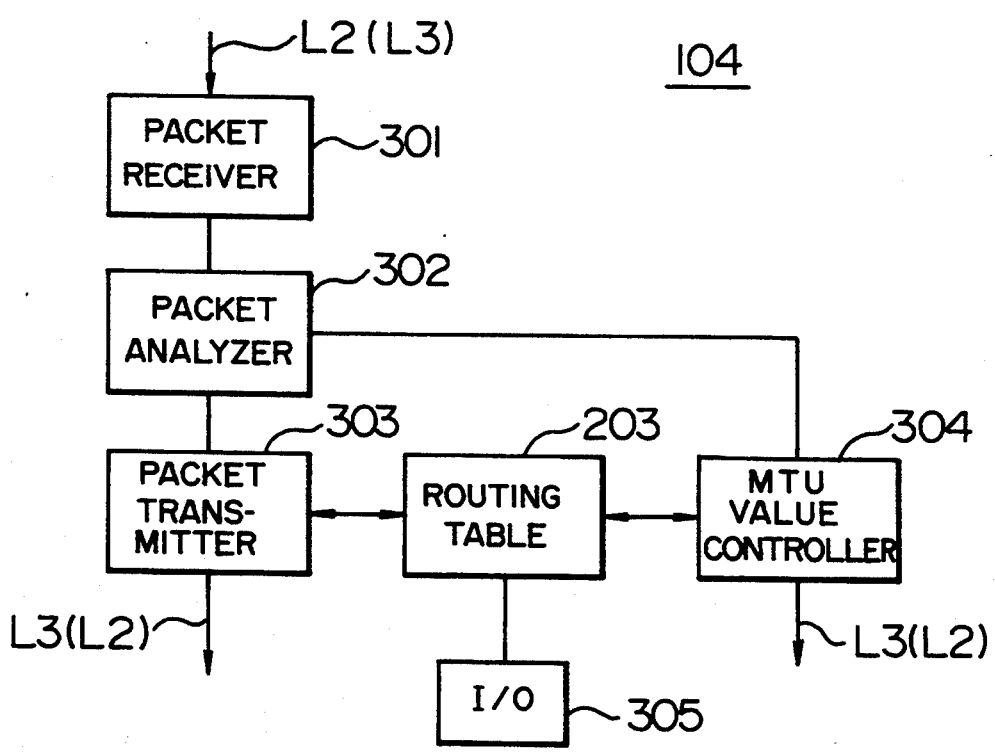

FIG. 5A

| TYPE = INTERROGATION | ORIGINATOR | RECEIVER (DESTINATION) | MTU VALUE |
|---|---|---|---|

FIG. 5B

| TYPE = INTERROGATION | ESA | ESB | 1500 |
|---|---|---|---|

MTU INTERROGATION RESPONDING PACKET

FIG. 6A

| TYPE = INTERROGATION RESPONSE | ORIGINATOR | RECEIVER | MTU VALUE |
|---|---|---|---|

FIG. 6B

| TYPE = INTERROGATION RESPONSE | ESB | ESA | 1200 |
|---|---|---|---|

MTU CHANGE INFORMING PACKET

FIG. 7A

| TYPE = CHANGE INFORMATION | ORIGINATOR | RECEIVER | MTU VALUE |
|---|---|---|---|

FIG. 7B

| TYPE = CHANGE INFORMATION | ISB | ESB | 1000 |
|---|---|---|---|

NETWORK SYSTEM AND METHOD OF MANAGING A MAXIMUM TRANSFER UNIT IN THE NETWORK SYSTEM

BACKGROUND OF THE INVENTION

1. Field of the Invention

The present invention relates to a network system and a method of managing a maximum transfer rate or unit of communication data in the network system. Especially, in the case where communication data is transferred in a network system using communication protocol for effecting transmission and reception of the communication data in unit of data of a predetermined amount, e.g., in unit of a packet, the invention relates to a network system which can manage and determine statically and dynamically a maximum value of packet length (maximum transfer unit (MTU)) capable of permitting the communication data to be prevented from being divided in end user systems and network transfer devices interconnected together in the network system, that is, in the course of transfer of the communication data, and a method of managing an optimum value of the maximum transfer unit in the network system.

2. Description of the Prior Art

Generally, in constructing a system in which a plurality of networks (for example, networks based on transmission control protocol/internet protocol (TCP/IP)) exist, the networks are mutually connected via transfer devices (for example, IP routers) to permit routing between end user systems interconnected via the plurality of networks. All of the plurality of networks do not have the same specification but in many applications each of them is constructed to have a different specification.

When considering, from the standpoint of for example the transfer size of data, data transfer in this type of network system wherein the plurality of networks are constructed to have different specifications, it is proved that when data permitted to be transmitted via a network is caused to be transmitted via a different network following routing through a transfer device, the size of a packet of the data is larger than the MTU of the different network and the data cannot be transmitted via the different network.

Conventionally, when data is transferred from one network having a large maximum transfer unit to a different network having a small maximum transfer unit in the network system having the plurality of networks interconnected together, a transfer device interposed between the networks having different maximum transfer units as described above must divide the data.

More particularly, the transfer device has the function to divide a packet received from the one network having a large maximum transfer unit into a plurality of packets which are each smaller than the maximum transfer unit of the different network having a small maximum transfer unit and transmit each of the divided data packets to an end user system behaving as destination via the different network.

In such a prior art network system, when data is transferred via a plurality of networks having different maximum transfer units, the transmission data is inconveniently divided in the course of data transfer and relatively large overhead is required for transfer of the data. As a result, the destination consumes much time for reconstruction of the divided packets and in addition, many packets must be transmitted and so reliability of the data transfer per se is degraded.

Concerning this type of network system, a prior art described in, for example, JP-A-63-131635 is known. This prior art pertains to packet length negotiation in a medium access control layer in the same local area network (LAN).

In the aforementioned prior art, an end user system (transmitting side) ready to transmit data does not at all consider packet lengths which are transferable via all the networks present on a midway route preceding a destination end user system (receiving side). Therefore, in the prior art, it is only possible for the transmitting side end user system to suppress the packet length to below a maximum transfer unit of a network to which the end user system is connected directly. Accordingly, in each network transfer device through which data passes during transfer, the transfer device divides a packet which is larger than a maximum transfer unit of each network connected to the transfer device to make divisional packets commensurate with the maximum transfer unit, thus raising problems that time efficiency (throughput) necessary for data transfer is degraded and reliability of the data transfer per se is consequently degraded.

SUMMARY OF THE INVENTION

An object of the invention is to provide a network system which can eliminate problems encountered in the prior art and a method of managing the maximum transfer unit in the network system.

Another object of the invention is to provide a network system which can decrease the number of operations of dividing transfer data in a data transfer midway route to improve throughput by managing the maximum transfer unit in the network system and a method of managing the maximum transfer unit in the network system.

Still another object of the invention is to provide a network system which can suppress the number of operations of dividing transfer data in a data transfer midway route by managing the maximum transfer unit in the network system even when the maximum transfer unit in the data transfer route is changed by changing of characteristics of the network system or the data transfer route in the network system is changed and to provide a method of managing the maximum transfer unit in the network system.

To accomplish the above objects, according to an aspect of the present invention, a method of managing, in a network system having at least two end systems, at least two networks respectively connected to the at least two end systems and at least one transfer device for connecting the networks and transferring data between the network, a maximum transfer unit of one unit of data transferred at a time on a transfer route connected between the two end systems and including the networks and the transfer device, includes the following steps. Providing a table having information about the transfer route in each of the end systems and the transfer device, and registering in each of the tables an optimum value of maximum data lengths of the one unit of data which are transferable on the transfer route as the maximum transfer unit for the transfer route.

According to another aspect of the present invention, a method of managing, in a network system having at least two end systems, at least three transfer devices for transferring between the end system data, at least three networks respectively for connecting an end system and a transfer device or connecting the transfer devices, and at least two transfer routes through which the two end systems are interconnected together via the networks and at least one of the transfer devices, a maximum transfer unit of one unit of data transferred at a time on each of the transfer routes, includes the following steps. Providing in each of the end systems and each of the transfer devices on each transfer route, a table having information about the corresponding transfer route, and registering in each of the tables an optimum value of maximum data lengths of the one unit of data which are transferable on the corresponding transfer route as the maximum transfer unit for the corresponding transfer route.

According to still another aspect of the present invention, in a network system having at least two end systems, at least two networks respectively connected to the at least two end systems, and at least one transfer device for connecting the networks and transferring data between the networks, one unit of data being transferred at a time on a transfer route connected between the two end systems and including the networks and the transfer device, the end systems and the transfer device each include a table having information about the transfer route, and a unit for registering in the table an optimum value of maximum data lengths of the one unit of data which are transferable on the transfer route as the maximum transfer unit for the transfer route.

Thus, according to the invention, the routing tables having routing information are provided respectively in the two end systems and at least one transfer device on each data transfer route, and an optimum value (minimum value) of maximum data lengths of one unit of data (e.g., a packet) which are transferable at a time through each of the networks on the transfer route is registered in each of the tables.

Through this, data transmitted from an end system can be prevented from being divided in the course of transfer and efficient data transfer can be effected.

In one example of the invention, when characteristics of the network system are changed, the optimum value registered in each table is changed statically or dynamically.

More specifically, when the optimum value is changed by changing of characteristics of the network system, the transfer device preferably informs each end system (and transfer device) on the transfer route of a changed optimum value and the optimum values registered in the tables of this transfer device and informed destinations are rewritten into the changed optimum value. But if the changed optimum value exceeds the optimum values which have already been registered, rewriting is not needed.

In another example of the invention, when the data transfer route is changed to a different one, optimum values registered in tables on the different transfer route are changed statically or dynamically.

More specifically, when the optimum value is changed by changing of characteristics of a transfer route, the transfer device on the transfer route whose characteristics are changed preferably informs each end system (and the transfer device) on the transfer route having changed characteristics of a changed optimum value and the optimum values registered in the tables of this transfer device and informed destinations are rewritten into the changed optimum value.

Thus, in one example of the invention, in respect of each data transfer route indicated by routing information (the information is used by each end user and the transfer device when a packet is to be transmitted or transferred to a data transfer destination. Since networks and devices participating in the transmission or transfer are different for individual data transfer destinations, the information selects participant networks and devices by using the individual data transfer destinations as entry to ensure correspondence between these networks and devices and the individual data transfer destinations), a minimum value of maximum packet lengths which are transferable through networks on the data transfer route is determined as a maximum transfer unit for the data transfer route and given to the routing tables by using the individual data transfer destinations as entry.

When the data transfer route is changed for some reason or other (for example, a fault of the transfer device), it is necessary to retrieve a minimum value of maximum transfer units of respective networks on the data transfer route after changing and update the maximum transfer unit given to respective tables of the individual networks and the transfer device present on the data transfer route to a new maximum transfer unit. To this end, a maximum transfer unit interrogating packet is transmitted to the transfer route and on the basis of the contents of a response packet from the individual networks and the transfer device on the data transfer route, changing of data transfer route and updating of optimum maximum transfer units for the route described on the routing tables are effected.

Further, when characteristics of the network system (for example, characteristics having such influence on the maximum transfer unit in the network system as to change the same) are changed, transfer data is preferably divided midway on a data transfer route into a plurality of packets. At that time, a maximum transfer unit change informing packet for informing all the systems and devices (end user systems and transfer devices) on the data transfer route of a changed maximum transfer unit is transmitted so that the maximum transfer units described on the routing tables of all the systems and devices on the data transfer route may be updated to an optimum value.

As will be seen from the above, in one example, in respect of each entry of each data transfer route in the routing information table held by the individual end user systems and the individual transfer devices, a maximum transfer unit transferable through the route without undergoing data division is given and managed. Through this, the end user system on the transmitting side can determine for each transfer destination a transmission packet length which makes a transmission packet free from division in the course of transfer and an optimum value of maximum transfer units which are different for individual data transmission destinations, that is, individual data transfer routes can be managed and determined. Accordingly, in the network system using the present invention, efficient data transfer can be effected in which useless overhead upon data transmission (division of a packet in the course of data transfer) can be suppressed.

Further, in response to changing of the data transfer route, a maximum transfer unit interrogating packet is transmitted, thereby ensuring that updating of the maximum transfer unit concomitant with the change of the data transfer route can be effected automatically.

Therefore, in accordance with the invention, the maximum transfer unit on the routing table can always be maintained at an optimum value even when the data transfer route is changed.

When network characteristics are changed midway in spite of the fact that the data transfer route is not changed, a packet is sometimes divided by a midway transfer device. In such a case, however, the network whose characteristics are changed transmits a maximum transfer unit change informing packet so that in individual systems and devices in the network system, the maximum transfer unit for the data transfer route may be updated automatically to maintain the maximum transfer unit on the routing table at an optimum value.

BRIEF DESCRIPTION OF THE DRAWINGS

FIG. 2 is a diagram showing an example of sequence of data transfer in the network system shown in FIG. 1;

FIG. 3A is a diagram showing an example of routing tables in the FIG. 1 network system;

FIG. 3B is a diagram showing an example of routing tables used when the data transfer route is changed in the FIG. 1 network system;

FIG. 3C is a diagram showing an example of routing tables used when characteristics of network system are changed in the FIG. 1 network system;

FIG. 3D is a diagram showing another example of routing tables used in the FIG. 1 network system;

FIG. 4 is a block diagram showing an example of construction of an end user system or a transfer device;

FIGS. 5A and 5B are diagrams showing examples of an MTU interrogating packet;

FIGS. 6A and 6B are diagrams showing examples of an MTU interrogation responding packet; and FIGS. 7A and 7B are diagrams showing examples of an MTU change informing packet.

DESCRIPTION OF THE PREFERRED EMBODIMENTS

Figure 1:
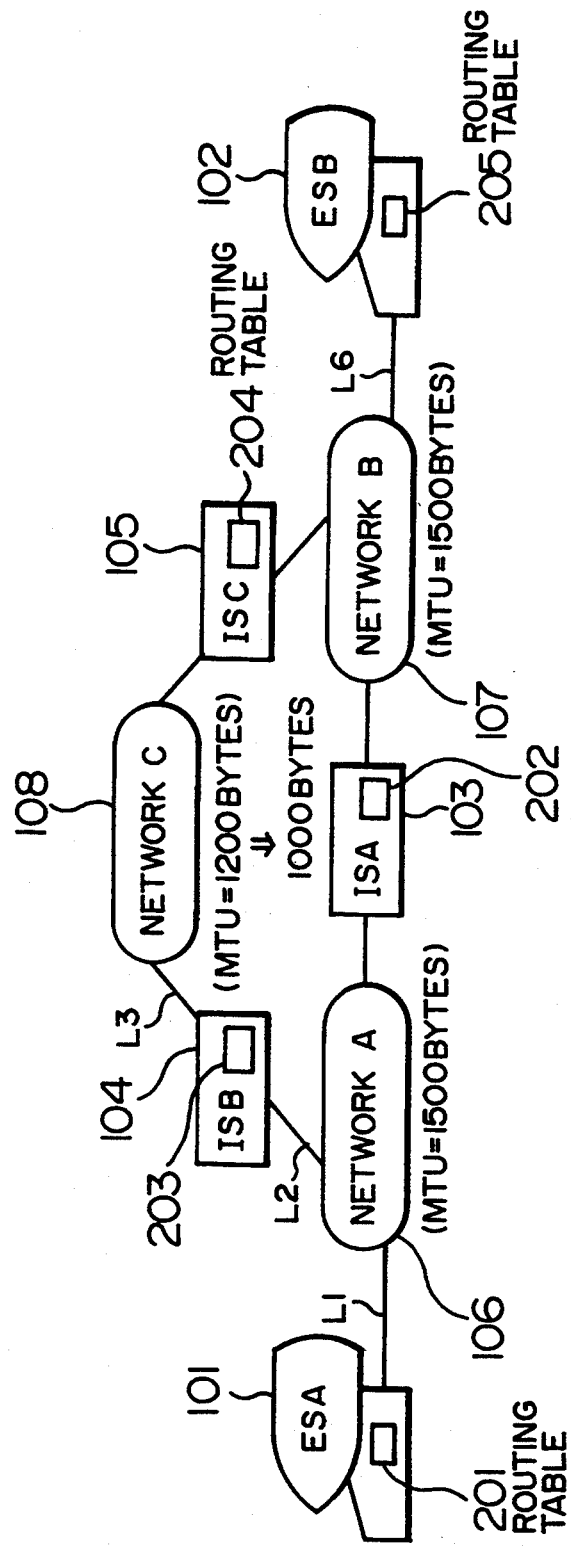
FIG. 1 is a block diagram showing an example of construction of a network system to which an embodiment of the invention is applied.

Method and apparatus of managing the maximum transfer unit in a network system according to an embodiment of the invention will now be described in greater detail with reference to the accompanying drawings.

FIG. 1 is a block diagram showing an example of construction of a network system to which an embodiment of the invention is applied, FIG. 2 is a diagram showing data transfer sequence useful to explain the operation of the FIG. 1 example, and FIGS. 3A to 3C are diagrams showing examples of routing tables used in the FIG. 1 example.

As is clear from FIG. 1, in the present embodiment, the invention is applied to a network system wherein as an example two transfer routes are provided between two end users and a constant amount of data (i.e., one unit of data) is transferred at a time through each transfer route. In the present embodiment, the one unit of data is represented by data of one packet unit and transfer thereof will be described.

Referring to FIG. 1, reference numerals 101 and 102 designate end systems, for example, end user systems ESA and ESB, 103 to 105 network transfer devices (internetwork systems) ISA to ISC and 106 to 108 networks A to C.

In the network system shown in FIG. 1, it is now assumed that the maximum transfer unit in each of the networks A 106 and network B 107 is, for example, 1500 bytes and the maximum transfer unit in the network C is, for example, 1200 bytes. The system ESA 101, transfer devices ISA 103, ISB 104 and ISC 105 and system ESB 102 are respectively provided with routing tables 201 to 205 respectively having the contents as shown in FIG. 3A. The maximum transfer unit referred to herein signifies a maximum data length of one unit of data which is transferable at a time. FIG. 4 is a block diagram showing an example of main part of the individual end user systems 101, 102 and individual transfer devices 103 to 105. Exemplified herein is the construction of the transfer device 104 and the remaining systems and transfer devices 101, 102, 103 and 105 may have the same construction.

Referring to FIG. 4, a packet receiver 301 receives a packet transmitted on a line L2 interconnecting the ISB 104 and network A 106. A packet analyzer 302 analyzes the type of the packet received by the packet receiver 301 to transfer the packet to a packet transmitter 303 if it is an ordinary data packet but to an MTU value controller 304 if it is another type of packet, for example, an MTU value interrogating packet, MTU value interrogation responding packet or MTU value change informing packet. The packet transmitter 303 looks up the routing table 203 and delivers the packet to a line L3 so as to transfer it to a transfer device described on the table. If the packet needs to be divided, the packet transmitter 303 performs division operation and transmits a resulting divisional packet. The MTU value controller 304 rewrites the MTU value of routing table 203 by using an MTU value of the received packet or rewrites an MTU value of the packet by using the MTU value of routing table 203 and thereafter delivers the packet to the line L3. Similarly, a packet transmitted from the network C108 onto the line L3 is received by the packet receiver 301 and delivered to the line L2 through the transmitter 303 or controller 304. An input/output (I/O) unit 305 delivers or receives data to or from the routing table 203 in order to perform such an operation as initialization of the table 203.

In the end user system 101 (102), the input of packet receiver 301 and the outputs of packet transmitter 303 and MTU value controller 304 are all connected to the line L1 (line L6).

On the assumption that data transfer is carried out between the end user systems ESA 101 and ESB 102 in the network system shown in FIG. 1, data transfer operation will be described with reference to transfer sequence shown in FIG. 2.

Initialization of each of the routing tables 201 to 205 will first be described. In the respective tables 201 to 205, the MTU value is set as shown in, for example, FIG. 3A through the I/O unit 305 by, for example, the operator. For setting of this value, a minimum value of MTU values of each transfer device and each network on a transfer route may be decided and set as an optimum value for the MTU value on the transfer route or as shown in FIG. 3A, an MTU value of a network which is adjacent in the destination direction may simply be set.

In the latter case, in order to set a minimum value of MTU values on the transfer route in each table, the following procedure is carried out. Firstly, an MTU interrogating packet as shown in FIG. 5A is delivered out of each of the end user system ESA 101 and ESB 102. For example, the ESA 101 delivers an interrogating packet having type=interrogation, originator-=ESA, receiver (destination)=ESB and MTU value=1500 bytes (MTU of the adjacent network A) as shown in FIG. 5B to a transfer route passing through the ISB (or two transfer routes passing through the ISB and ISA, respectively). For example, the interrogating packet is delivered to the transfer route passing through the ISB and supplied to the ISB 104 via the network A.

Since the MTU value corresponding to destination ESB described on the table 203 of ISB is 1200 bytes, the interrogating packet is changed in MTU value to 1200 bytes by the MTU controller 304 and supplied to the ISC 105 via the network C. In the ISC, the MTU value corresponding to destination ESB described on the table 204 is 1500 bytes and so the MTU value of the interrogating packet now being 1200 bytes is not rewritten. The interrogating packet is then supplied to the ESB 102 via the network B. In response to the received packet, the ESB 102 transmits an MTU interrogation responding packet as shown in FIG. 6B to the ESA 101 via the same transfer route. In this case, the MTU value of the interrogation responding packet is the same value (1200 bytes) as that of the interrogating packet received by the ESB 102 and this value corresponds to a minimum value of MTU values on the transfer route.

In accordance with the MTU value of the interrogation responding packet, the MTU value corresponding to destination ESB described on the table 204 of the ISC is rewritten from 1500 to 1200 bytes.

It will be appreciated that in the example shown in FIG. 3A, the MTU value is registered in each of the routing tables 201 and 205 of the ESA and ESB in respect of only one of the two transfer routes which has higher priority, for example, the route passing through the ISA.

Accordingly, upon packet transmission, transfer is carried out through the route described on these tables. Alternatively, MTU values may precedently be registered in respect of the two transfer routes as shown in FIG. 3D.

In this case, the two transfer routes may be ranked in priority and upon packet transmission, a packet may be transmitted through a transfer route of higher priority.

Specifically, in the table 201 shown in FIG. 3D, the MTU value for the route passing through the transfer device ISB is changed to 1200 bytes in compliance with the MTU value=1200 bytes of the interrogation responding packet.

Similarly, as for an interrogating packet delivered from the ESA 101 to the transfer route passing through the ISA 103, the MTU for this route is 1500 bytes and therefore, when the interrogating packet reaches the ESB 102, the MTU value corresponding to this route described on each table of each of the ISA 103 and ESA 101 is kept to be 1500 bytes.

In a manner similar to the above, the ESB can participate in initialization of MTU values for the two transfer routes. In this case, the ESB 102 delivers an MTU interrogating packet to the ESA 101 via the two transfer routes to initialize the tables 201 to 205. In particular, the MTU value corresponding to destination ESA described on the table 203 of ISB 104 is changed to 1200 bytes. In this way, each of the tables 201 to 205 is set with a minimum value of MTU values for each transfer route.

Starting of data transfer from ESA 101 to ESB 102 will now be described. Firstly, the ESA 101 looks up the routing table 201 in this system to know that the transfer route of data destined for the ESB 102 passes through the ISA 103 and the maximum transfer unit of data is 1500 bytes.

Accordingly, the data transfer from ESA 101 to ESB 102 is executed by carrying out transmission/reception of data having a maximum transfer unit of 1500 bytes through the medium of the transfer device ISA 103 and networks A 106 and B 107. Similarly, transfer of data in order for the ESB 102 to respond to the ESA 101 is carried out by the ESB 102 by using data having the maximum transfer unit which is 1500 bytes.

Under this condition, it is assumed that, for example, the ISA 103 becomes defective for some reason or other to disable transfer of data.

Since a condition diagnostic packet (check packet) is periodically sent from the ESA 101 to the ISA 103, the ESA 101 detects a fault of the ISA 103 by receiving no response to the check packet from the ISA.

For example, the condition diagnostic packet corresponds to the packet interact groper (PING) of IP layer in the TCP/IP protocol. The packet transmitter 303 of the ESA 101 transmits the condition diagnostic packet to each transfer device and each network and the packet receiver 301 detects a response from them.

At that time, in the ESA 101, the data transfer route in the entry of the routing table 201 of ESA 101 purporting that the transfer route passes through the transfer device ISA 103 is changed to a route passing through the transfer device ISB 104 as shown in FIG. 3B.

If, upon the initialization of the respective tables, MTU values of the respective tables are set only in respect of the transfer route passing through the ISA, the ESA 101 transmits a maximum transfer unit interrogating packet in order to update the MTU values in compliance with the new data transfer route. The interrogating packet is sequentially transferred to the devices and system on the transfer route, that is, ISB 104, ISC 105 and ESB 102 and as in the precedence, each device and the system transfer an interrogation responding packet.

The individual devices and the system on the transfer route, that is, each of the ESA 101, ISB 104, ISC 105 and ESB 102 updates the maximum transfer unit described on the routing table of its own in compliance with an MTU value in a response packet responding to the interrogation packet.

Since in the illustrated example the maximum transfer unit of the network C 108 is a minimum value on the transfer route, 1200 bytes of this minimum value is registered, as a maximum transfer unit on the new data transfer route between the ESA 101 and ESB 102, in the routing table of each device and the system as shown in FIG. 3B. After completion of changing of the data transfer route, data transfer between the ESA 101 and ESB 102 is effected using a packet of maximum 1200 bytes.

Alternatively, in the case where upon the initialization of the individual tables the MTU values of the respective tables have already been set in respect of the two transfer routes through which the ISA and ISB pass, the ESA does not transmit any MTU interrogating packet but switches the priority rank between the two transfer routes. Specifically, in the table of the ESA, the route passing through the ISB is placed in higher priority rank than the route passing through the ISA.

Through this, subsequent transfer of packet is effected via the route passing through the ISB.

In the event that the ESB 102 detects a fault of the ISB in compliance with a condition diagnostic packet, a similar procedure is taken.

A description will now be given of the case where characteristics of the system or the transfer route are changed. Changing of characteristics of the network system or the transfer route signifies that construction and characteristics of the network system or any component on the transfer route, that is, the network, transfer device, end user system or line are changed. Through this changing, the minimum value of MTUs for transfer route is sometimes changed.

For example, it is now assumed that by changing the construction of the network C 108, its MTU value is changed from 1200 bytes to, for example, 1000 bytes. When the network C 108 is thus changed, this change in MTU value may be detected or recognized by the operator and informed to the ISB or ISC. Alternatively, the MTU value of the network C 108 may be managed by a program for controlling slave communication devices through TCP/IP protocol and when the MTU value is changed, the operator may change the MTU values of the ISB and ISC.

Then, for example, when a packet of 1200 bytes is sent from the ESA 101 to the ESB 102 via the ISB, the ISB 104 must divide the packet upon transfer of data to the ISC via the network C 108.

Therefore, before effecting division and transmission of the packet, the packet transmitter of the ISB 104 transmits to systems 101 and 102 and device 105 on the route a packet to inform them of the fact that the maximum transfer unit for the data transfer route between ESA 101 and ESB 102 which passes through the ISB is now 1000 bytes.

The MTU change informing packet is formatted as shown in FIG. 7A, the informing packet transferred from ISB to ISC and ESB is formatted as shown in FIG. 7B, and the same informing packet is also transferred to the ESA.

Accordingly, the transfer device 105 and end user systems 101 and 102 on the transfer route receive the packet and thereafter the device and each system update, by means of the MTU value controller, the maximum transfer unit in the entry of data transfer route to ESA 101 and ESB 102 described on the routing table of the device and each system, and transfer a maximum transfer unit change informing packet to the adjacent transfer device or end user system. As a result, the information in the routing table of the device and each system in the network system is updated as shown in FIG. 3C.

It will be appreciated that the minimum MTU value for the transfer route passing through the ISA is kept to be 1500 bytes in each table of each of the ISA, ESA and ESB.

Instead of informing a new MTU value from the ISB 104 by using an MTU change informing packet, the new MTU value may be written by the operator in the table of each of the ISA, ESA and ESB through the I/O unit.

Alternatively, when the minimum value of MTU values for transfer route is changed owing to change of characteristics of the network system, the operator may recognize the change to cause the transfer device to transmit a change informing packet.

Accordingly, before transmitting the aforementioned MTU change informing packet, the ISB 104 divides the packet of 1200 bytes received as transfer data into, for example, a packet of 1000 bytes and a packet of 200 bytes and thereafter transfers the divisional packets sequentially to the ISC 105 preceding the ESB 102.

Alternatively, the transmission of the MTU change informing packet may precede the division of the received packet and transfer of the divisional packets.

The subsequent data transfer between the ESA 101 and ESB 102 is effected with the maximum transfer unit being 1000 bytes via the route passing through the ESA 101, ISB 104, ISC 105 and ESB 102. In other words, both the ESA 101 and ESB 102 perform the subsequent data transfer by using a packet length of maximum 1000 bytes to be transmitted.

In the foregoing, the change (dynamic change) of the maximum transfer unit is effected in the course of data transfer but even when the change of the maximum transfer unit is effected while no data transfer being carried out, the change (static change) of the maximum transfer unit described on the routing table of each device and each system in the network system can be effected by transmitting a maximum transfer unit change informing packet from a device at which the change occurs to the remaining device and system.

The foregoing embodiment of the invention has been described as being applied to the network system constructed of three networks but the present invention may also be applied to a network system including a greater number of networks.

The invention may also be applicable to a network system having only one transfer route. Further, the invention may also be applicable to a network system having three or more end user systems.

In the foregoing embodiment, the minimum value of MTU values for networks on each transfer route is registered as optimum value in each table but when restrictions are imposed on MTU values for transfer devices and/or lines and so on, an optimum value may be determined by taking values of these restrictions into consideration.

According to the embodiment of the invention described previously, an end user system ready to transmit a packet can transmit data by using a packet length commensurate with a maximum transfer unit in the direction of a destination. Even when a fault occurs in a transfer device midway on a transfer route or the construction of the network system is changed, the routing tables of the respective transfer devices and respective end user systems on the transfer route are updated dynamically to follow the fault or the change in construction, so that data transfer can always be effected with an optimum packet length and overhead due to useless packet division which prevails in data transfer between the end user systems can be suppressed, thus permitting effective data transfer.

As described above, according to the present invention, a transmission packet can be prepared by having a knowledge of a maximum transfer unit for each transfer destination to which data is to be transmitted in order that the division of packet midway on the route can be suppressed during data transmission, thereby improving the data transfer efficiency, i.e., throughput in the whole network system.

In addition, according to the invention, even when changing of the data transfer route and network characteristics is effected, the change can be followed dynamically to ensure that the latest and optimum maximum transfer unit can always be held in the routing table and data transfer can be effected with an optimum packet length.

We claim:

1. In a network system having at least two end user systems, at least two networks for connecting said at least two end user systems, at least one transfer device connected between said networks for transferring data between said networks, and at least one transfer route connected between said at least two end user systems, a method of managing a maximum transfer unit of one unit of data transferred at a time on the transfer route comprising the steps of:

providing a plurality of tables, each table having information about said at least one transfer route and being included in one of said at least two end user systems and one of said at least one transfer device; and registering in each of said tables, as a maximum transfer unit, an optimum value of maximum data lengths of one unit of data which are transferable on said at least one transfer route.

2. A method according to claim 1 wherein in said registering step, said optimum value on said transfer route is a minimum value of maximum data lengths of one unit of data which are transferable through each of said at least two networks on said transfer route.

3. A method according to claim 1 wherein each of said tables has a name of said transfer unit as entry.

4. A method according to claim 1 further comprising the steps of changing statically or dynamically said optimum value registered in each of said tables when characteristics of said network system is changed.

5. A method according to claim 4 wherein in said changing step, when said optimum value is changed by changing of characteristics of said network system, said transfer device informs each end system on said transfer route of a changed optimum value so that said optimum value registered in said table of each end system is rewritten into said changed optimum value.

6. A maximum transfer unit managing method according to claim 1, further comprising the step of:

transferring, from one of said at least two end user systems to the other of said at least two end user systems through said transfer route, one unit of data whose amount is not more than said optimum value which is obtained by referring to said table of the one of said at least two end user systems.

7. A maximum transfer unit managing method according to claim 1, wherein each of said tables has a name of the destination end user system, a name of said transfer device and said optimum value.

8. In a network system having at least two end user systems, at least three networks, at least three transfer devices each connected between two of said at least three networks for transferring data between the two networks, and at least two transfer routes through which said two end user systems are interconnected together, a method of managing a maximum transfer unit of one unit of data transferred at a time on the transfer route comprising the steps of:

providing a plurality of tables, each table being included in one of said at least two end user systems and one of said at least three transfer devices and having information about one of said at least two transfer routes; and registering in each of said tables, as a maximum transfer unit for one of said at least two transfer routes, an optimum value of maximum data lengths of one unit of data which are transferable on the transfer route.

9. A maximum transfer unit managing method according to claim 8 wherein in said registering step, said optimum value on said corresponding route is a minimum value of maximum data lengths of one unit of data which are transferable through each of said at least three networks on said corresponding transfer route.

10. A maximum transfer unit managing method according to claim 8 wherein each of said tables has a name of said transfer unit as entry.

11. A maximum transfer unit managing method according to claim 8 further comprising the steps of changing statically or dynamically, when said data transfer route between said at least two end systems is changed to a different one, said optimum value registered in respective tables of said end systems and at least one transfer device on said different transfer route.

12. A maximum transfer unit managing method according to claim 8 wherein each of said transfer devices performs the steps of:

detecting whether a data length of received one unit of data is larger than a maximum transfer unit of a network behaving as destination of transmission of said one unit of data;

responding to the detection to inform end user systems on a transfer route including said transfer device of said maximum transfer unit of said network behaving as transmission destination; and dividing said received one unit of data and transferring a division of data to said network behaving as transmission destination.

13. A maximum transfer unit managing method according to claim 12 further comprising the steps of rewriting said optimum value registered in said table of each of said at least two end user systems on said maximum transfer unit of said network behaving as transmission destination, and wherein said transfer device further performs the steps of responding to the detection rewrite said optimum value registered in said table of said transfer device into said maximum transfer unit of said network behaving as transmission destination.

14. A maximum transfer unit managing method according to claim 8, further comprising the step of:

transferring, from one of said at least two end user systems to the other of said at least two end user systems through one of said at least two transfer routes, one unit of data whose amount is not more than said optimum value which is registered in association with the one of said at least two transfer routes in said table of the one of said at least two end user systems and obtained by referring thereto.

15. A maximum transfer unit managing method according to claim 8, wherein each of said tables has, for each of said at least two routes, a name of the destination end user system, a name of the associated transfer device and the associated optimum value.

16. A method of managing, in a network system having at least two end systems, at least two networks respectively connected to said at least two end systems and at least one transfer device for connecting said networks and transferring data between said networks, a maximum transfer unit of one unit of data transferred at a time on a transfer route connected between said at least two end systems and including said at least two networks and said transfer device, said method comprising the steps of:

providing a plurality of tables, each table having information about said transfer route and being included in one of said at least two end systems and one of said at least one transfer device; and registering, as a maximum transfer unit, in each of said tables, an optimum value of maximum data lengths of one unit of data which are transferrable on said transfer route;

wherein each of said at least one transfer device performs the steps of:

detecting whether a data length of received one unit of data is larger than a maximum transfer unit of a network behaving as destination of transmission of said one unit of data, responding to the detection to inform end user systems on a transfer route including said transfer device of said maximum transfer unit of said network behaving as transmission destination, and dividing said received one unit of data and transferring a division of data to said network behaving as transmission destination.

17. A method according to claim 16 further comprising the steps of rewriting said optimum value registered in said table of each of said at least two end systems of said transfer route including said transfer device into said maximum transfer unit of said network behaving as transmission destination, and wherein said transfer device further performs the step of responding to the detection to rewrite said optimum value registered in said table of said transfer device into said maximum transfer unit of said network behaving as transmission destination.

18. A method of managing, in a network system having at least two end systems, at least two networks respectively connected to said at least two end systems and at least one transfer device for connecting said networks and transferring data between said at least two networks, a maximum transfer unit of one unit of data transferred at a time on a transfer route connected between said at least two end systems and including said at least two networks and said at least one transfer device, said method comprising the steps of:

providing a plurality of tables, each table having information about said transfer route and being included in one of said at least two end systems and one of said at least one transfer device; and registering, as a maximum transfer unit, in each of said tables an optimum value of maximum data lengths of one unit of data which are transferrable on said transfer route;

wherein said registering step includes the steps of:

causing an end user system to interrogate each of said at least two networks on said transfer route about a maximum data length which is transferable through each network, and determining the shortest data length of maximum data lengths obtained through the interrogation as said optimum value.

19. A method of managing, in a network system having at least two end systems, at least three transfer devices for transferring data between said at least two end systems, at least three networks respectively for connecting an end system and a transfer device or said at least three transfer devices, and at least two transfer routes through which two end systems are interconnected together via said at least three networks and at least one of said at least three transfer deices, a maximum transfer unit of one unit of data transferred at a time on each of said at least two transfer routes, said method comprising the steps of:

providing a plurality of tables, each table being included in one of said at least two end systems and one of said at least three transfer devices on each transfer route, and each table having information about a corresponding transfer route;

registering, as a maximum transfer unit, in each of said tables an optimum value of maximum data lengths of one unit of data which are transferable on said corresponding transfer route; and changing statically or dynamically, when said transfer route between said at least two end systems is changed to a different one, said optimum value registered in respective tables of said end systems and at least one of said at least three transfer devices on said different transfer route;

wherein said changing step includes the steps of:

causing an end user system to interrogate each of said at least three networks on said different transfer route about a maximum data length which is transferable through each network, and determining the shortest data length of maximum data lengths obtained through the interrogation as an optimum value to which said registered optimum value is to be changed.

20. A method of managing, in a network system having at least two end systems, at least three transfer devices for transferring data between said at least two end systems, at least three networks respectively for connecting an end system and a transfer device or said at least three transfer devices, and at least two transfer routes through which two end systems are interconnected together via said at least three networks and at least one of said at least three transfer devices, a maximum transfer unit of one unit of data transferred at a time on each of said at least two transfer routes, said method comprising the steps of:

providing a plurality of tables, each table being included in one of said at least two end systems and one of said at least three transfer devices on each transfer route, and each table having information about a corresponding transfer route;

registering, as a maximum transfer unit, in each of said tables an optimum value of maximum data lengths of the one unit of data which are transferable on said corresponding transfer route; and changing statically or dynamically, when characteristics of said transfer route between said at least two end system is changed, said optimum value registered in respective tables of said at least two end systems and at least one of said at least three transfer devices on said transfer route having changed characteristics.

21. A maximum transfer route managing method according to claim 20 wherein said changing step comprises the step of:

causing said transfer device on said transfer route having changed characteristics to inform each end system on said transfer route having changed characteristics of a changed optimum value when said optimum value is changed by changing of characteristics of said transfer route so that said optimum value which has been registered in each table of each end system may be rewritten to said changed optimum value.

22. A method of managing, in a network system having at least two end systems, at least three transfer devices for transferring data between said at least two end systems, at least three networks respectively for connecting an end system and a transfer device or said at least three transfer devices, and at least two transfer routes through which two end systems are interconnected together via said at least three networks and at least one of said at least three transfer devices, a maximum transfer unit of one unit of data transferred at a time on each of said at least two transfer routes, said method comprising the steps of:

providing a plurality of tables, each table being included in one of said at least two end systems and one of said at least three transfer devices on each transfer route, and each table having information about a corresponding transfer route; and registering, as a maximum transfer unit, in each of said tables an optimum value of maximum data lengths of one unit of data which are transferable on said corresponding transfer route;

wherein said registering step includes the steps of:

causing an end system to interrogate each of said networks on said transfer route about a maximum data length which is transferable through each network, and determining the shortest data length of maximum data lengths obtained through the interrogation as said optimum value.

23. A network system having at least two end systems, at least two networks respectively connected to said at least two end systems, and at least one transfer device for connecting said networks and transferring data, one unit of data being transferred at a time on a transfer route lying between said at least two end systems and including said at least two networks and said transfer device, said t least two end systems and said at least one transfer device each comprising:

a memory having stored therein a table having information about said transfer route; and means, connected to said memory for registering in said table an optimum value of maximum data lengths of one unit of data which are transferable on said transfer route as a maximum transfer unit for said transfer route.

24. A network system according to claim 23 wherein each of said at least two end systems and said at least one transfer device each further comprise means for changing statically or dynamically said optimum value registered in each table when characteristics of said network system are changed.

25. A network system having at least two end systems, at least two networks respectively connected to said at least two end systems, and at least one transfer device, for connecting said networks and transferring data, one unit of data being transferred at a time on a transfer route lying between said at least two end systems and including said at least networks and said transfer device, said at least two end systems and said at least one transfer device each comprising:

a memory having stored therein a table having information about said transfer route;

means, connected to said memory, for registering in said table an optimum value of maximum data lengths of one unit of data which are transferable on said transfer route as a maximum transfer unit for said transfer route; and means, connected to said memory, for transferring one unit of data based on said registered optimum value to said transfer route in accordance with said information in said table.

26. A transfer managing system for use in a network system having at least two end systems, at least two networks respectively connected to said at least two end systems and at least one transfer device for connecting said networks and transferring data between said networks, a maximum transfer unit of one unit of data transferred at a time on a transfer route connected between said at least two end systems and including said at least two networks and said at least one transfer device, said transfer managing system comprising:

a memory having stored therein a plurality of tables, each table having information about said transfer route and being included in one of said at least two end systems and one of said at least one transfer device; and means for registering, as a maximum transfer unit, in each of said tables, an optimum value of maximum data lengths of one unit of data which are transferrable on said transfer route;

wherein each of said at least one transfer device comprises:

means for detecting whether a data length of received one unit of data is larger than a maximum transfer unit of a network behaving as destination of transmission of said one unit of data, means for responding to the detection to inform end user systems on a transfer route including said transfer device of said maximum transfer unit of said network behaving as transmission destination, and means for dividing said received one unit of data and transferring a division of data to said network behaving as transmission destination.

27. A system according to claim 26, further comprising:

means for rewriting said optimum value registered in said table of each of said at least two end user system son said transfer route including said transfer device into said maximum transfer unit of said network behaving as transmission destination;

wherein said transfer device further comprises:

means for responding to the detection to rewrite said optimum value registered in said table of said transfer device into said maximum transfer unit of said network behaving as transmission destination.

28. A transfer managing system for use in a network system having at least two end systems, at least two networks respectively connected to said at least two end systems and at least one transfer device for connecting said networks and transferring data between said at least two networks, a maximum transfer unit of one unit of data transferred at a time on a transfer route connected between said at least two end systems and including said at least two networks and said at least one transfer device, said transfer managing system comprising:

a memory having stored therein a plurality of tables, each table having information about said transfer route and being included in one of said at least two end systems and one of said at least one transfer device; and mean for registering, as a maximum transfer unit, in each of said tables an optimum value of maximum data lengths of one unit of data which are transferrable on said transfer route;

wherein said means for registering comprises:

means for causing an end user system to interrogate each of said at least two networks on said transfer route about a maximum data length which is transferable through each network, and means for determining the shortest data length of maximum data lengths obtained through the interrogation as said optimum value.

29. A transfer managing system for use in a network system having at least two end user systems, at least two networks for connecting said at least two end user systems, at least one transfer device connected between said networks for transferring data between said networks, and at least one transfer route connected between said at least two end user systems, said transfer managing system comprising:

a memory having stored therein a plurality of tables, each table having information about said at least one transfer route and being included in one of said at least two end user systems and one of said at least one transfer device; and means for registering in each of said tables, as a maximum transfer unit, an optimum value of maximum data lengths of one unit of data which are transferable on said at least one transfer route.

30. A system, according to claim 29, wherein said optimum value on said transfer route is a minimum value of maximum data lengths of one unit of data which are transferable through each of said at least two networks on said transfer route.

31. A transfer managing system, according to claim 29, wherein each of said tables has a name of said transfer unit as an entry.

32. A transfer managing system, according to claim 29, further comprising:

means for changing statically or dynamically said optimum value registered in each of said tables when characteristics of said network system is changed.

33. A transfer managing system, according to claim 32, wherein when said optimum value is changed by said means for changing, said transfer device informs each end system on said transfer route of a changed optimum value so that said optimum value registered in said table of each end system is rewritten into said changed optimum value.

* * * * *